May 21, 1940. A. F. O'CONNOR Re. 21,460
BRAKE MECHANISM
Original Filed Jan. 16, 1935 4 Sheets-Sheet 1
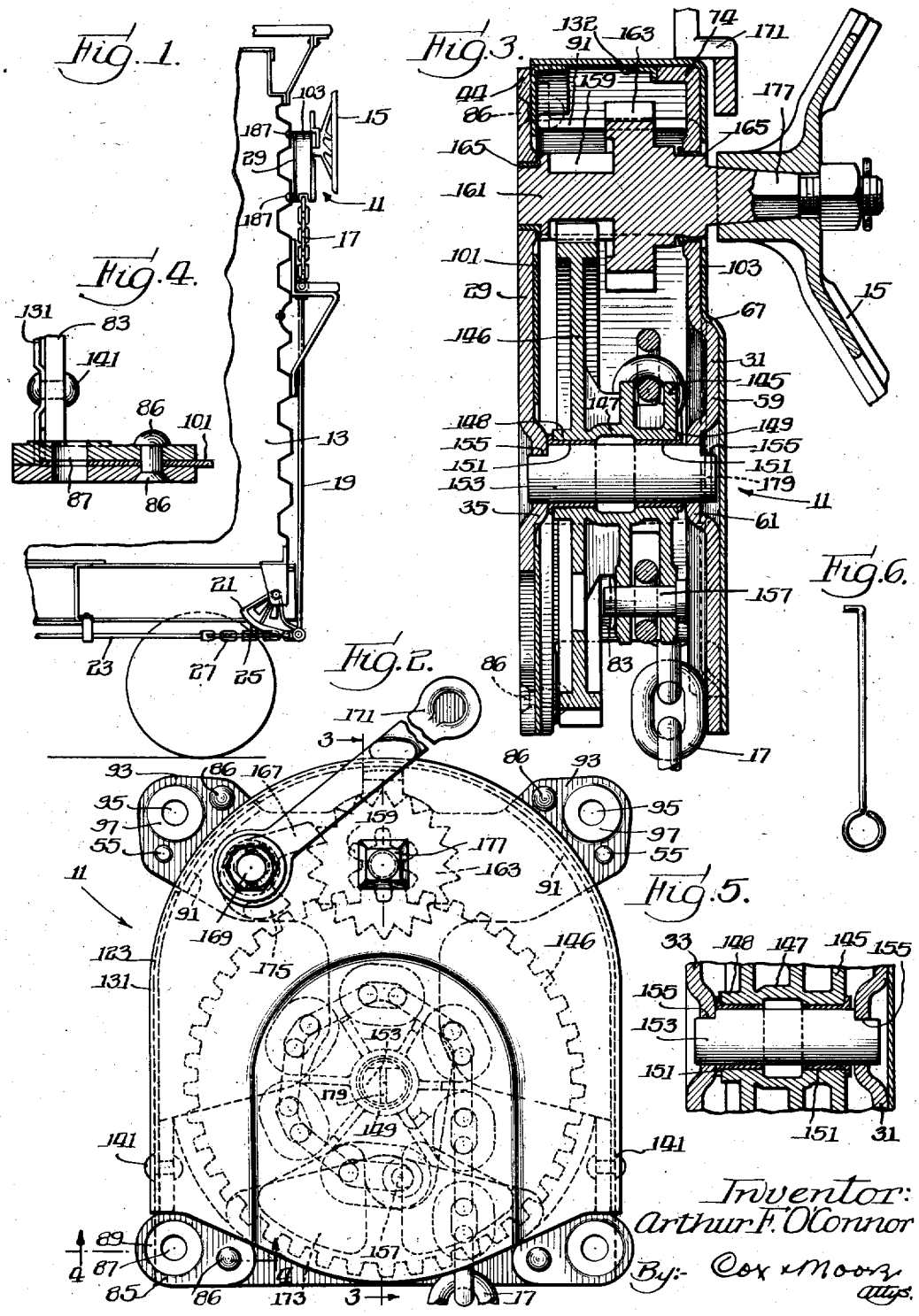

BRAKE MECHANISM

Original Filed Jan. 16, 1935 4 Sheets-Sheet 2

Inventor:
Arthur F. O'Connor
By:- Cox & Moore Attys.

BRAKE MECHANISM

Original Filed Jan. 16, 1935 4 Sheets-Sheet 3

Inventor:
Arthur F. O'Connor
By:- Cox & Moore attys.

May 21, 1940. A. F. O'CONNOR Re. 21,460

BRAKE MECHANISM

Original Filed Jan. 16, 1935 4 Sheets-Sheet 4

Inventor:
Arthur F. O'Connor
By:- Cox & Moore Attys.

Reissued May 21, 1940

Re. 21,460

UNITED STATES PATENT OFFICE 21,460

BRAKE MECHANISM

Arthur F. O'Connor, Chicago, Ill., assignor, by mesne assignments, to Union Asbestos & Rubber Company, Chicago, Ill., a corporation of Illinois Original No. 2,047,168, dated July 7, 1936, Serial No. 2,070, January 16, 1935. Application for reissue February 8, 1937, Serial No. 124,693

18 Claims. (Cl. 254—149)

My invention relates to brake mechanism and has more particular reference to manually operable and controlled brake setting means for railway cars.

An important object of my present invention is to provide railway brake winding mechanism of simplified construction whereby the same may be assembled at the factory at low cost and delivered ready for quick attachment as a unit to a railroad car with minimum labor and expense.

Another important object of the present invention is to provide an improved housing for brake winding mechanism of simple yet rugged construction, which is light, yet compact and, at the same time, provides great strength to resist the shocks and jars to which equipment of this character is subjected in service.

Another important object is to provide a frame, in which the tensioning mechanism of the brake operating apparatus may be quickly and easily assembled, said frame being of skeleton construction to reduce its weight yet adequately strong to perform its part supporting function, a casing adapted for assembly on the frame in order to enclose the parts carried by the frame, said casing being of relatively inexpensive construction and material.

Another important object is to provide a brake-tensioning mechanism carried on a frame and a casing or housing adapted for assembly on the frame to provide an enclosure for the tensioning mechanism, said casing being formed so that at least a part thereof is removable readily in order to uncover the mechanism and facilitate repair of the mechanism or the replacement of its parts.

Another important object is to provide brake-tensioning mechanism including a flexible winding element and a winding drum on which the element may be coiled, the whole enclosed in a casing or housing and adapted for mounting as on a railway car, said mechanism being formed and arranged to facilitate removal and replacement of the winding drum or the winding element without detaching the remaining portions of the element from its mounting.

Another important object is to provide a relatively inexpensive railroad brake setting mechanism of low cost and having unusual strength for carrying the parts of the winding mechanism and the stresses induced during the winding operation.

Another important object is to provide a railroad brake tensioning apparatus wherein the operating parts are mounted between a pair of rugged frame elements comprising spiders, preferably formed as castings, between which the operating elements of the mechanism may be quickly and easily assembled and the spiders secured together with minimum effort and expense in fabricating the device. The construction also includes a relatively inexpensive sheet metal casing mounted on and carried by said spiders and adapted for assembly thereon contemporaneously with the elements of the winding mechanism, said casing preferably comprising cooperating sheet metal shells of relatively flimsy material and the invention includes the arrangement of the cooperating sheet metal parts and the mounting thereof on the spiders so that the device provides great strength for supporting the operating elements of the mechanism and, at the same time, provides a relatively inexpensive casing, which is adequate to perform its function of enclosing the operating elements and protect the same from the weather.

Another important object is to provide enclosed brake mechanism, including winding means and a housing enclosing the same and arranged so that the housing may be readily removed to permit inspection of all parts of the winding mechanism without dismantling the same, the winding means being supported in a frame which is not disturbed by the removal of the casing part. This frame, may, of course, be disassembled to permit repair or replacement of the winding means or any of the elements thereof. The winding mechanism also includes a part which most frequently requires replacement and this is arranged in the frame to permit removal thereof from the assembly without disturbing the frame or the remaining parts of the winding means. This arrangement consequently makes possible either the inspection of the working parts or the replacement of parts while the device remains in place upon the car. From a safety standpoint, it is of great advantage to be able to inspect the condition of the working parts from time to time. However, where the brake mechanism, including the frame and housing, are permanently riveted together, as in existing constructions, and the mechanism is further secured together by the usual four or more rivets by which the unit is mounted to the car, it is impossible to inspect the mechanism without removing the unit from the car and completely dismantling the same. The working mechanism, in structures which are permanently riveted or otherwise secured, may become altogether unsafe and unserviceable and since inspection is rendered difficult, due to the permanent enclosure of the parts, such brakes constitute an actual menace to safety.

Numerous other objects, advantages, and inherent functions of the invention will be apparent from the following description, which, taken in connection with the accompanying drawings, discloses a preferred embodiment of the invention.

Referring to the drawings:

Figure 1 is a view in vertical section taken longitudinally through a railroad car showing my invention as mounted in operating position on the car;

Figure 2 is a front view of the device shown in Figure 1;

Figure 7:
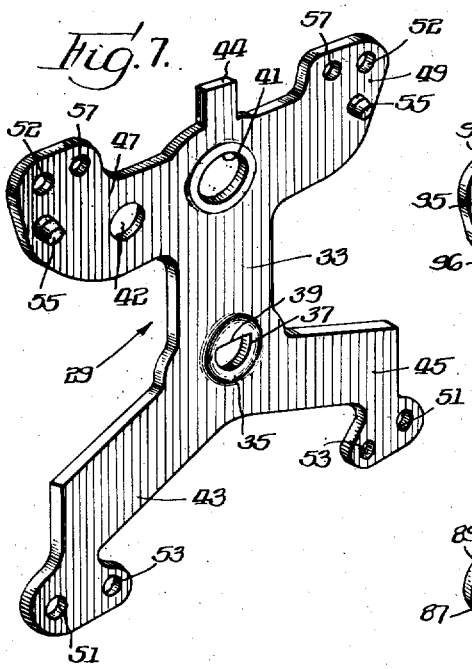
Figure 8:
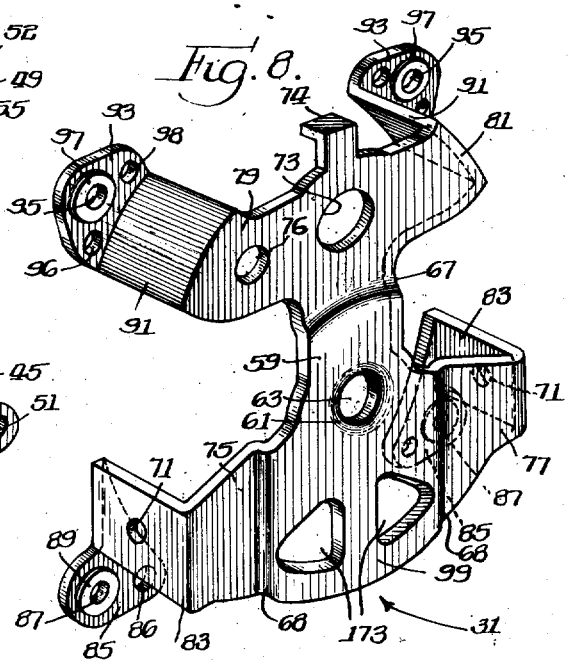
Figure 9:
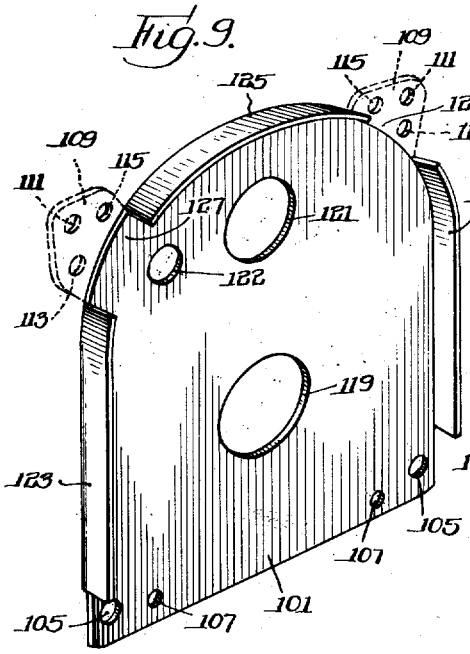
Figure 10:
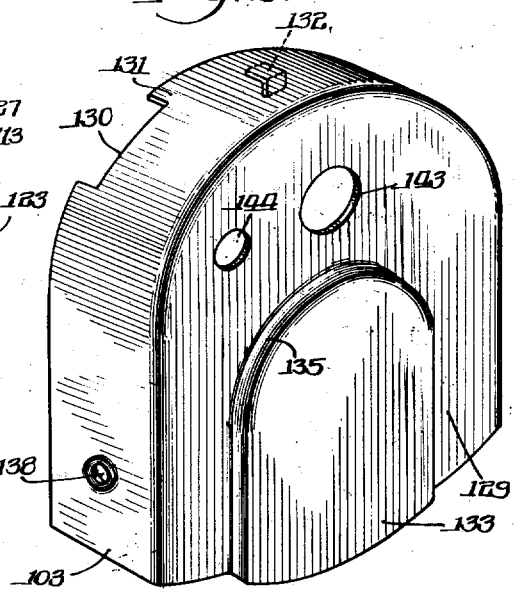
Figure 11:
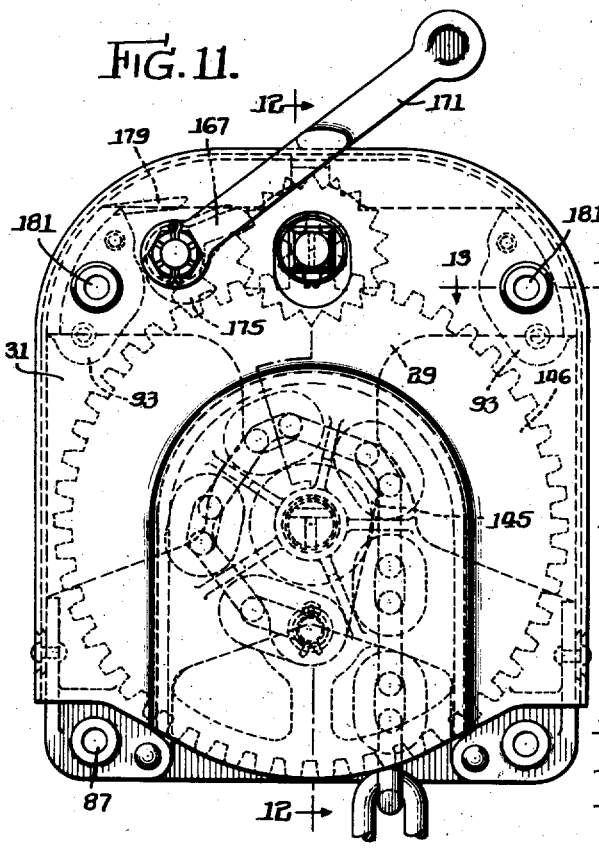

Figures 3 and 4 are sectional views taken substantially and respectively along the lines 3—3 and 4—4 in Figure 2;

Figure 5 is a fragmentary sectional view showing a modified form of the device as illustrated in Figure 3;

Figure 6 is a perspective view of an axle-pulling instrument, which may be used with the device to aid in dismantling a part thereof;

Figures 7 and 8 are perspective views of frame elements utilized in the device of my present invention;

Figures 9 and 10 are perspective views of cooperating elements forming the enclosing casing;

Figure 11 is a front view of a brake construction embodying my invention and showing a modified construction of the housing to accommodate a high powered heavy duty brake.

Figure 12:
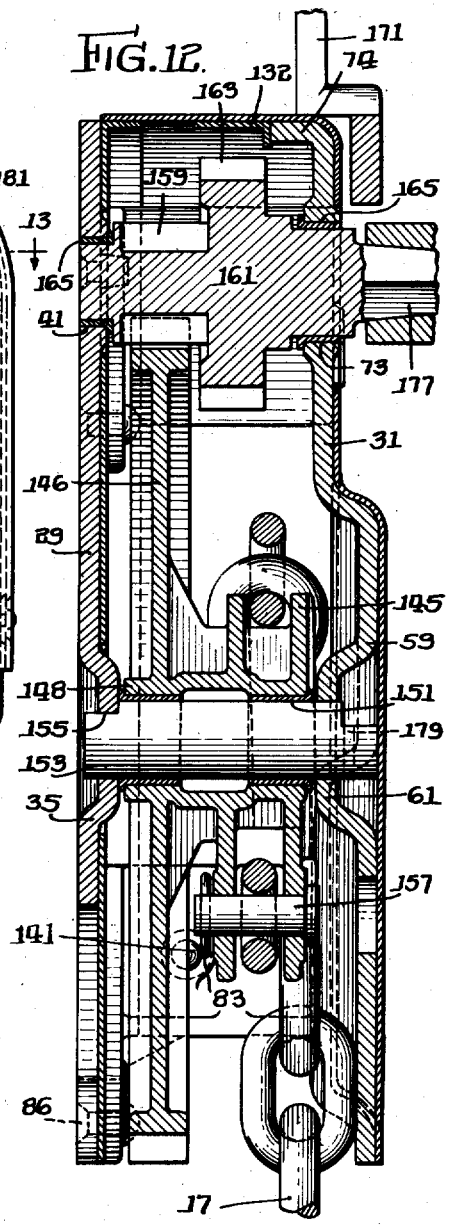
Figure 13:
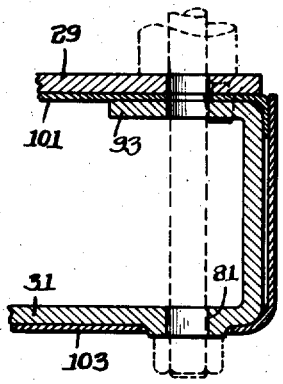
Figure 14:
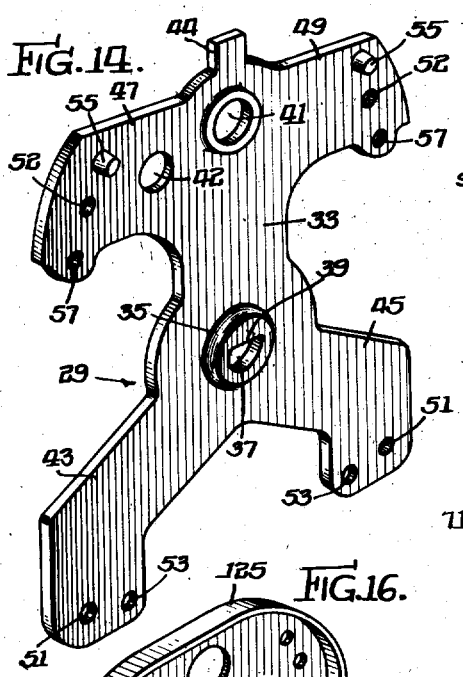
Figure 15:
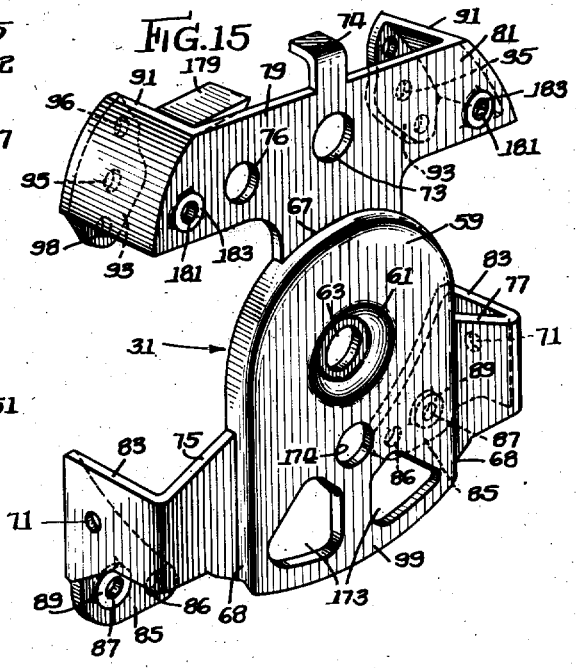
Figure 16:
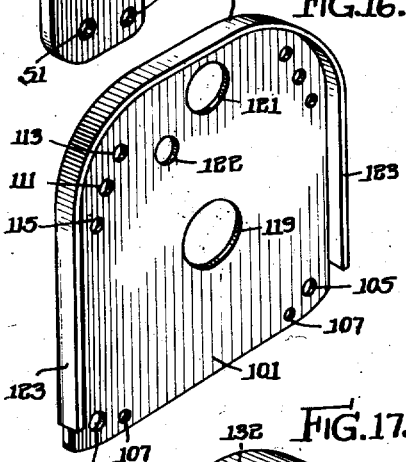
Figure 17:
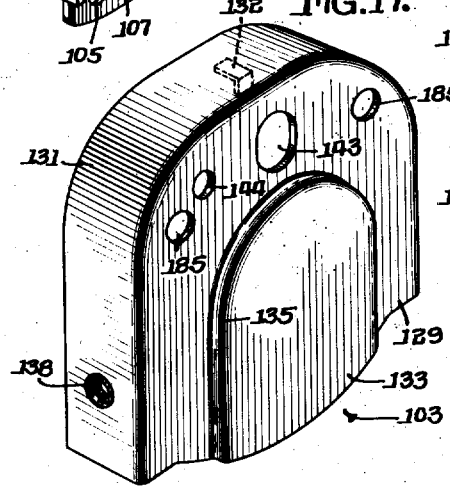
Figure 18:
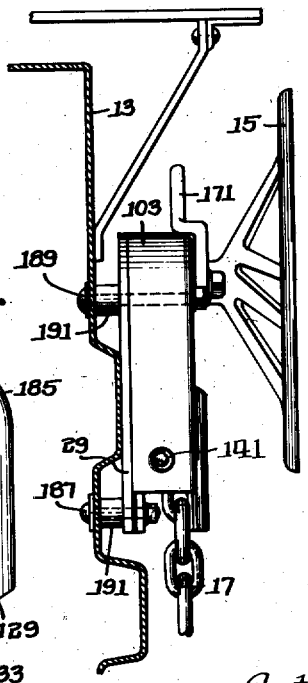
Figure 19:
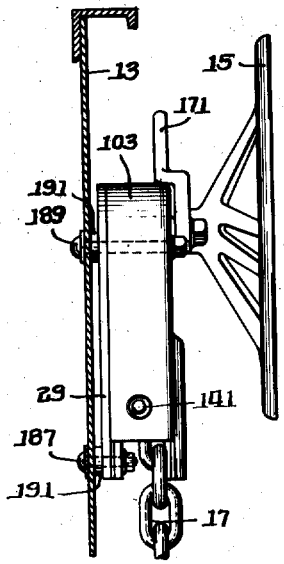

Figures 12 and 13 are sectional views taken substantially along the lines 12—12 and 13—13 in Figure 11;

Figures 14 and 15 are perspective views of frame parts comprising the construction shown in Figure 11;

Figures 16 and 17 are perspective views of housing parts employed in the assembly shown in Figure 11; and Figures 18 and 19 illustrate preferred modes of mounting the brake structure.

To illustrate my invention, I have shown on the drawings a brake-operating mechanism 11 adapted for assembly as a unit in operating position as on a railroad car 13. The brake-operating mechanism comprises cooperating elements forming winding mechanism supported in a mounting comprising a housing for enclosing the winding mechanism and protecting the same from the weather as well as a frame of sufficient strength to carry the elements of the winding mechanism and sustain the stresses imparted thereto as a result of its operation. The winding mechanism is adapted to be manually operated as by means of a hand wheel 15 in order to tension a flexible element, such as a chain 17, which is connected to the brake rigging of the car in any suitable fashion.

In the illustrated embodiments, the chain is attached to a draw rod 19, which, in turn, is connected to one arm of a tiltable bell crank 21, carried on the car 13 and connected to transfer the movement of the pull rod 19 to a rod 23, which is connected for operating the brake rigging. Obviously, any preferred or equivalent means may be utilized for transferring the drawing effect of the chain 17 to the brake rigging although it is preferable to utilize a transfer element or elements adapted to multiply the brake-applying force of the chain, this being accomplished, in the illustrated embodiment, by forming the bell crank with a winding surface 25 having a progressively diminishing radius, on which a flexible element 27, which connects with the drawing rod 23, is wound as the brake-applying movement is transferred to said draw rod.

The mounting, in which the winding mechanism is assembled, preferably comprises a frame portion and a casing portion. The frame may be made in any convenient fashion to provide spaced frame portions, on and between which to mount the winding mechanism. The frame is preferably made of cast metal, such as iron, and preferably comprises cooperating parts 29 and 31 of spider-like construction. The part 29 may comprise a central strut-forming portion 33 formed with an embossment 35 near its lower end, said embossment containing a preferably non-circular shaft-receiving perforation 37 having a flattened side 39. The upper end of the central strut 33 contains a preferably circular shaft-receiving opening 41. The frame element 29 includes a pair of legs 43 and 45 extending outwardly in opposite directions from the lower portion of the central strut 33 and a pair of arms 47 and 49 extending outwardly in opposite directions from the upper portion of the strut 33. A central projection 44 also may be formed at the upper end of the strut 33 between the arms 47 and 49. The arm 47 has a shaft-receiving perforation 42 and both the legs 43 and 45 and the arms 47 and 49, at their extremities, are provided with perforations 51 and 52 adapted to receive fastening members, by which the device may be attached to the car 13. Each leg 43 and 45, at its extremity, also has a perforation 53 in spaced relationship with respect to the perforation 51, while the arms 47 and 49 each have a dowel 55 and perforations 57, for rivets or other fastening devices, spaced from the perforation 52 therein. The arms, legs, and central strut preferably lie in a substantially common plane.

The frame element 31 also comprises a central portion or strut 59 having an embossment 61 at its mid-portions formed with a circular axle-receiving opening 63, corresponding with the opening 37 of the frame member 29. The frame element 31 has legs 75 and 77 and arms 79 and 81 corresponding with the legs 43 and 45 and arms 47 and 49 of the element 29. Upwardly of the opening 63, the strut 59 is embossed inwardly as at 67 and the legs 75 and 77 are also embossed inwardly at 68 so that the upper portions of the strut, including the arms 79 and 81 and also the legs 75 and 77, are slightly offset inwardly with respect to the lower portions of the strut. The upper end of the strut 59 is formed with a second preferably circular axle-receiving opening 73 corresponding with the opening 41 of the frame member 29. The arm 79 also has an axle-receiving opening 76 corresponding to the opening 42 of the element 29. The legs 75 and 77, at their extremities, have offset portions 83 terminating in feet 85 corresponding with the ends of the legs 43 and 45 of the frame element 29, said feet having each a perforation 86 and a perforation 87 defined by an embossment 89, said perforations 86 and 87 respectively corresponding with the perforations 53 and 51 in the terminal portions of the legs 43 and 45 of the element 29.

The arms 79 and 81 at their extremities also have offset portions 91 terminating in feet 93 corresponding with the terminal portions of the arms 47 and 49 of the element 29, said feet 93 each having a perforation 95, defined by an embossment 97, and perforations 98 and 96, said perforations respectively corresponding with the openings 52 and 57 and the dowels 55 in the terminal portion of the arms 47 and 49. The frame element 31 also has an integral apron 99 extending downwardly between the legs 75 and 77 below the axle-receiving opening 63.

The frame element 31 also may be formed at the upper end of the strut portion 59 with an upwardly extending flanged projection 74 between the arms 79 and 81.

The casing preferably comprises a pair of relatively inexpensive cooperating sheet metal portions 101 and 103, illustrated respectively in Figures 9, 10, 16, and 17 of the drawings. The element 101 forms a backing and comprises a substantially flat sheet metal plate adapted to fit upon the upper inner surface of the element 29. At its lower corners, the plate is provided with perforations 105 and 107 corresponding with the perforations 51 and 53 in the legs 43 and 45 of the frame element 29. If desired, as shown in Figures 9 and 10, the plate also may be provided with lugs 109 in its upper portions corresponding with the terminal ends of the arms 47 and 49 of the frame element 29, said lugs having perforations 111, 115, and 113 corresponding respectively to the perforations 52, 57, and the dowels 55 of said arms. In the embodiment shown in Figures 16 and 17, the openings 111, 115, and 113 are formed directly in the plate 101. The plate is also formed with an opening 119 to receive the embossment 35 of the frame member 29 when the plate is assembled thereon and openings 121 and 122 corresponding with the openings 41 and 42.

The plate 101 also is preferably formed with upstanding flanges 123 at its opposite side edges and 125 along its upper edge, there being openings 127 between the ends of the flange 125 and the adjacent ends of the flanges 123 opposite the lugs 109 in the form shown in Figures 9 and 10.

The cover portion 103 comprises a sheet metal element comprising a relatively flat front 129 and a preferably continuous marginal flange 131 extending rearwardly at the opposite side and top edges of the front. This flange is notched as at 130 in the forms shown in Figures 9 and 10 to accommodate the outwardly extending feet 93 of the frame element 31 as shown in Figure 8. The lower edge of the front 129 is extended and curved as at 133 to conform with the shape of the apron portion 99 of the frame member 31. The cover portion 103 is adapted to fit upon the frame element 31 with the front portion 129 lying upon the surfaces of the portions 59, 75, 77, 79, and 81 of said element with the flange 131 lying upon the outer surfaces of the offset portions 83 and 91 of said element and the flanged portion 74 of the frame engaging under the middle of the flange 132 between the arms 79 and 81. The front of the casing portion 103 also is offset as at 135 to conform with the offset arrangement of the strut 59 and of the legs 75 and 77.

The casing portion 103 is provided with perforations 138 formed in the flanged portion 131 near the opposite ends of said flanged portion and the frame 31 has corresponding perforations 71 formed in the offset portions 83. The flanged portion 103 may also have an inwardly extending lug 132 formed or secured thereon opposite the lug 74 so that the shell may be secured on the frame member 31 merely by inter-engaging the lugs 132 and 74 and applying the fasteners 141.

The element 103 has perforations 143 and 144, which align with the perforations 73 and 76 of the frame member 31 when the casing member is so mounted. The parts are assembled by placing the casing member 101 on the inner surface of the frame member 29 with the perforations 105 in alignment with the perforations 51 and by assembling the frame member 31 with its feet 85 resting on the corner portions of the plate so that the perforations 51, 87, and 105 are in alignment. When so positioned, the feet 93, in the form shown in Figures 1 through 10, extend in the spaces 127 between the flanges 123 and 125, and the ears 109, if provided, extend therebetween so that the perforations 52, 95, and 111 are also in alignment, as are also the dowels 55, and the perforations 96 and 113 and the perforations 58, 98, and 115. In the form shown in Figures 11 through 19, the feet 93 extend entirely within the confines of the casing portions 101 and 103. In both forms, the feet 93 of the element 31 register with the end portions of the arms 47 and 49 of the frame element 29. The parts are held in alignment by means of the dowels 55 fitting the openings 96 and 113 and are held together by suitable fastening means, such as rivets, penetrating the aligned perforations 57, 98, and 115, and the perforations 53, 86, and 107. It will be seen, from an inspection of Figures 2, 3, 11, and 12, that, when the parts are assembled, the peripheral portions of the flange 131 overlie the flange portions 123 and 125 of the backing 101 so that the casing elements 101 and 103 cooperate to form a substantially weather tight closure for the winding mechanism mounted between the frame portions 29 and 31.

As heretofore mentioned, the winding mechanism is supported entirely by and between the frame elements 29 and 31, which are of sufficiently rugged character to provide adequate strength for supporting the same and for receiving the stresses and strains imparted thereto as a result of the brake-setting operation. The casing elements 101 and 103 are carried by the frame in position to snugly enclose the winding mechanism without subjecting these relatively light casing parts to strains and stresses.

The winding mechanism may be of any suitable or preferred construction and is supported within the housing provided by the parts 101 and 103 by and between the frame elements 29 and 31. The winding mechanism comprises a winding drum 145 and gear 146 preferably formed as an integral element comprising a central bearing 147 having end portions 148 and 149, respectively, within the drum 145 and the gear 146 and adapted to receive bushings 151 in the opposite ends of the bearing whereby to rotatably mount the element on a shaft 153. The opposed ends of the shaft 153 are secured respectively in the aligned openings 37 and 63 of the frame members 29 and 31, the shaft having a non-circular end including flat side 155 to fit the edge 39 of the opening 37, so that the shaft 153 is non-rotatably supported by and between the frame elements 29 and 31.

As shown in Figure 5, the end of the shaft supported in the opening 63 may have a non-circular configuration similar to its other end so that both ends may be non-rotatably held. I prefer, however, to form the end of the shaft carried in the opening 63 in such a way that the entire shaft may be drawn out of the frame through the opening when the cover 103 is removed, said cover comprising a portion normally overlying the embossment 59 to prevent the shaft from being moved axially when the cover is in place. This arrangement is a simple expedient for accomplishing the non-rotative mounting of the shaft and, moreover, facilitates the assembly of the shaft between the frame elements, and also permits the axle to be withdrawn and the drum and gear to be dismounted from the winding mechanism without dismounting the frame and the rest of the mechanism from mounted position on the car.

The winding drum 145 is formed to receive the tensioning element 17, one end of which is attached to an anchor pin 157 mounted in the drum. This pin may be a rivet fastened in the winding drum, or may be a headed pin secured by a cotter, as shown. Where the pin and cotter arrangement is used, the pin may easily be removed from the winding drum, in order to detach the element 17, without dismounting the drum from the winding mechanism assembly. This may be accomplished merely by dismounting the cover element 103 after removing the fasteners 141 and then rotating the drum to bring the head of the pin 157 opposite one or other of the openings 173 formed in the lower portions of the strut 59 below the axle opening 63 in the embodiment shown in Figures 1 through 10. These openings serve also to reduce the weight of the frame element 31 without sacrificing its strength. In the form shown in Figures 11 through 19, however, the openings 173 serve only to reduce the weight of the element 31, a separate opening 174 being provided to permit the pin 157 to be withdrawn. The axle 153 also may be withdrawn from the bearings 151, after the cover 103 is dismounted, by means of a drawing tool, shown in Figure 6, having an end adapted to interfit in an opening 179 in the axle in order to draw the pin axially from its bearings to thus release the winding drum and driving gear.

The winding drum is arranged so that when the same is turned in a counter-clockwise direction, viewing Figures 2 and 11 of the drawings, the flexible tensioning element 17 will be wound around the winding drum in a direction to draw the rod 19 in a direction to actuate the brake rigging and cause the brakes to be applied. The drum-driving gear 146 is drivingly associated with a pinion 159, mounted between the upper portions of the frame elements 29 and 31. The pinion 159 is preferably formed as a part of an integral element 161, which is journalled for rotation at its opposite ends in the openings 41 and 73 of the frame elements 29 and 31, suitable bushings 165 being inserted in said openings to form bearings for said rotatable element. The rotatable element 161 is also preferably formed with an integral ratchet portion 163 adjacent the pinion 159 in position to register with a pawl 167 comprising a fitting rotatably mounted on a shaft 169 journalled for rotation at its opposed ends in the perforation 42 of the element 29 and the perforation 76 of the element 31. The shaft 169 has an end of non-circular configuration projecting outwardly of the casing through the openings 76 and 144 and a pawl-actuating handle 171 is mounted on said projecting end to provide for turning the shaft. The pawl 167 has a tip adapted to engage the ratchet 163, the weight of the pawl being utilized to normally urge the tip into engagement with said ratchet.

In order to raise the pawl from ratchet engaging position, the shaft 169 carries a collar fixed thereon and having a pawl-raising finger 175 adapted normally to underlie the pawl when the handle is in the position illustrated in Figure 3. If the handle 171 is moved in a counter-clockwise direction, viewing Figure 2, it will turn the shaft 169 in a direction to raise the pawl-actuating finger under the ratchet-engaging portion of the pawl and force the same out of engagement with the ratchet. The rotatable element 161 has a shank 177, projecting through openings 73 and 143, and on which is mounted the hand wheel 15, so that by turning the hand wheel, the ratchet 163, as well as the pinion 159, may be rotated. The pawl 167, when in engagement with the ratchet, normally prevents the rotatable element 161 from turning in a counter-clockwise direction, viewing Figure 2, so that after the brakes have been tensioned, the pawl will hold the apparatus in brake-tensioning position. To release the brake, it is only necessary to move the handle 171 in a counter-clockwise direction, viewing Figures 2 and 11, in order to release the pawl, whereupon the back tension exerted by the brakes on the chain 17 will cause the winding drum and gear 146 to rotate in a clockwise direction and impart a counter-clockwise rotation to the element 161, viewing Figures 2 and 11. As soon as the brakes are released, the handle 171 may be returned to the position shown in Figures 2 and 11, permitting the pawl 167 to again engage the ratchet. Thereafter, in order to tension the brakes, it is merely necessary to manipulate the hand wheel in order to turn the element 161 in a clockwise direction, viewing Figures 2 and 11. Such movement is permitted by the pawl and ratchet and causes the pinion 159 to drive the gear 146 and with it the winding drum 145 in a counter-clockwise direction, viewing Figures 2 and 11, with the result that the chain is wound around the drum and causes the brakes to be tensioned as heretofore described.

Movement of the pawl 167 in a counter-clockwise direction, viewing Figures 2 and 11, is limited in the form shown in Figures 1 through 10 by one of the offset leg portions 91. In the form shown in Figures 11 through 19, however, a projecting finger 179 is formed on the frame 31 in position to lie in the path of movement of the pawl in order to limit the ratchet releasing movement thereof.

The embodiment, shown in Figures 1 through 10, comprises a brake construction sufficiently powerful for ordinary purposes. The embodiment illustrated in Figures 11 through 19 discloses a heavy duty brake mechanism adapted for use where high brake tensioning capacity is necessary, as, for instance, on unusually heavy cars. It will be noted that in order to increase the tension, applicable to the element 17, in response to a given turning movement applied to the handle 15, the gear 146 in the embodiment shown in Figures 11 through 19 is of larger diameter than the corresponding gear in the mechanism shown in Figures 1 through 10. In order to provide an enclosed mechanism embodying the larger gear while maintaining uniform spacement between the rivet openings 87 and 95, which spacement is a railroad standard, I have, in the higher powered construction, enlarged the casing portions 101 and 103 and the frame elements 29 and 31 and have arranged the feet 93 so as to extend inwardly instead of outwardly as is the case in the lower powered mechanism.

It will be noted that the openings 87 in both embodiments are easily accessible for the attachment of fastening elements and that the openings 95 in the lower powered construction are also readily accessible. In the high power brake construction, however, the openings 95 are enclosed within the casing and I have consequently formed an opening 181 in the arms 79 and 81 of the frame 31 of the high power brake. These openings 181 are each defined by an embossment 183 and are in alignment with the openings 95. The cover 103 of the high power brake also is formed with openings 185 of a size sufficient to receive the embossments 183.

The lower corners of both forms may be secured on a wall of the car 13 by means of bolts 187 or other fastening members extending through openings in the car wall and through the openings 87. The upper corners of the low power brake tensioning mechanism may be secured in similar fashion. The upper portions of the high power brake mechanism, however, are secured by means of bolts 189 or similar fastening members of sufficient length to penetrate not only the openings 95 but also the openings 181 as clearly shown in Figures 13, 18, and 19, so that portions of the fastening member 189 extend within the housing. It is also desirable to apply spacing washers 191 between the frame element 29 and the gear wall on which it is attached and these washers may be of suitable thickness, as shown in Figures 18 and 19, in order to permit the brake-tensioning mechanism to be mounted in proper alignment on the wall no matter what its configuration.

I do not herein claim the particular tensioning mechanism per se since the same forms the subject matter of my co-pending application, Serial Number 711,155, filed February 14, 1934, but I do claim the novel features of the mechanism housing and support and the mechanism in combination with the housing and support.

The construction of the mechanism housing and support is extremely simple and facilitates assembly of the device. Moreover, the frame, in which the elements of the mechanism are carried, has unusual strength and rigidity and yet is inexpensive to manufacture; and the casing, in conjunction with the frame, is adequately strong to protect the winding mechanism from the deleterious effects of the weather and from other damage, although the casing itself is of light material and of simple, relatively inexpensive construction.

It is thought that the invention and numerous of its attendant advantages will be understood from the foregoing description, and it is obvious that numerous changes may be made in the form, construction and arrangement of the various parts, without departing from the spirit or scope of my invention and without sacrificing any of its attendant advantages, the forms herein described being merely for the purpose of illustrating the invention, and I do not desire to limit the invention in any way to the particular construction shown.

Having thus described my invention, what I claim as new and desire to secure by Letters Patent is as follows:

1. In a brake operating mechanism, the combination, with winding mechanism, of a mounting comprising rigid frame means providing spaced portions by and between which said winding mechanism is carried, and means comprising a pair of cooperating housing portions, carried by said frame, in position to form an enclosure for the winding mechanism.

2. In a brake operating mechanism, the combination, with winding mechanism, of a mounting comprising rigid frame means providing spaced portions, by and between which said winding mechanism is carried, and means forming an enclosure for the winding mechanism on the frame, said frame means comprising cast metal and said enclosure comprising cooperating casing portions of sheet metal.

3. In a brake operating mechanism, the combination, with winding mechanism, of a mounting comprising rigid frame means providing spaced portions, by and between which said winding mechanism is carried, and housing means cooperatively associated with said frame means to enclose the back as well as the front of said mechanism, said enclosure comprising a cover element secured on said frame and readily removable in order to facilitate inspection of or repairs to the winding mechanism.

4. In a brake operating mechanism, the combination, with winding mechanism of a mounting comprising rigid frame means providing spaced portions, by and between which said winding mechanism is carried, and housing means cooperatively associated with said frame means to enclose the back as well as the front of said mechanism, said winding mechanism comprising a rotatable element journalled on an axle carried by and between said spaced frame members, and the axle cooperates with at least one of said frame members to prevent rotation of the axle in the frame.

5. In a brake operating mechanism, the combination, with winding mechanism of a mounting comprising rigid frame means providing spaced portions, by and between which said winding mechanism is carried, and housing means cooperatively associated with said frame means to enclose the back as well as the front of said mechanism, said winding mechanism comprising a rotatable element journalled on an axle carried by and between said spaced frame members, and one of the frame members cooperates with said axle to prevent longitudinal movement of the axle in one direction, said other frame member being formed to permit withdrawal of the axle therethrough whereby to permit removal of the rotatable element carried by said axle from the assembly.

6. In a brake-operating mechanism, the combination, with winding mechanism, of a mounting comprising rigid frame means providing spaced portions, by and between which said winding mechanism is carried, said rigid frame being of skeletal construction and adapted for attachment on a vehicle in a substantially permanent manner, and cover means on said frame and forming a weather-excluding enclosure for the winding mechanism, said cover means being readily removable to allow inspection of the mechanism.

7. In a brake operating mechanism, the combination, with winding mechanism, of a mounting comprising rigid frame means providing spaced portions by and between which said winding mechanism is carried, said rigid frame being of skeletal construction and adapted for attachment on a vehicle in a substantially permanent manner, and cover means on and cooperatively associated with said frame to form a weather excluding enclosure for the winding mechanism, said cover having portions overlying the front of said winding mechanism and marginal edges offset in position enclosing the sides of said mechanism, portions of said frame cooperating with said offset edges to support the same, said cover being removable from said frame to permit inspection of the mechanism.

8. A brake operating unit adapted for substantially permanent mounting on a vehicle and comprising the combination, with winding mechanism, of a mounting comprising rigid frame means providing spaced portions by and between which said winding mechanism is carried, and housing means carried by and cooperatively associated with said frame means in position to form an enclosure for the back as well as the front of the winding mechanism, at least a portion of the housing being readily movable to permit inspection of the winding mechanism without disturbing the same or dismounting the unit from the vehicle.

9. In a brake operating mechanism, the combination, with winding mechanism including a winding drum and means to drive the same, of a mounting for said mechanism comprising frame means providing rigidly interconnected, spaced-apart portions by and between which said winding drum is carried, and means on said frame means forming enclosure means for the winding mechanism, said frame means comprising a pair of cooperating elements and said enclosure means comprising a housing element clampingly secured by and between said cooperating elements.

10. In a brake operating mechanism, the combination, with winding mechanism including a winding drum and means to drive the same, of a mounting for said mechanism comprising frame means providing rigidly interconnected, spaced-apart portions by and between which said winding drum is carried, and means on said frame means forming enclosure means for the winding mechanism, said frame means comprising a pair of cooperating elements and said enclosure means comprising a housing element clampingly secured by and between said cooperating elements, and another cooperating housing element carried by the frame means, said housing elements having interfitting edges whereby, when the parts are assembled, said housing elements may cooperate to form a weather-tight enclosure for the winding mechanism.

11. In a brake operating mechanism, the combination with winding mechanism, including a rotatable power transmitting element and means to drive the same, of a mounting for said mechanism comprising frame means providing rigidly interconnected, spaced-apart portions by and between which said rotatable element is carried, said rotatable element being journalled on an axle having portions mounted in said spaced-apart frame portions, said frame portions being formed to permit withdrawal of the axle therefrom whereby to permit removal of the rotatable element from the assembly, said frame means having an opening through which said element may be inspected, and cover means removably carried by said frame means in position to cover said opening and enclose said mechanism, said cover means being normally carried in position holding said axle in mounted position supporting said rotatable element.

12. In a brake operating mechanism as set forth in claim 11, wherein said rotatable power transmitting element comprises a winding drum and wherein said winding mechanism, in addition to said winding drum, comprises a pinion drivingly connected with said winding drum, a ratchet wheel connected with said pinion, and a detent pawl swingable into and out of operable engagement with said ratchet wheel whereby selectively to prevent rotation thereof in at least one direction, said pinion and ratchet wheel being carried on shafts supported on said frame means and enclosed therein by said cover means.

13. In a brake operating mechanism, the combination with winding mechanism including a rotatable power transmitting element and means to drive the same, of a mounting for said mechanism comprising frame means providing rigidly, interconnected, spaced-apart portions by and between which said rotatable element is carried, support means on said frame means for supporting said rotatable power transmitting element in operative position, said frame means being formed to permit withdrawal of said support means therefrom to allow removal of the rotatable element from the assembly, said frame means having an opening through which said element may be inspected, and cover means removably carried by said frame means in position to cover said opening and enclose said mechanism, said cover means having a portion in position to engage said support means when said cover is in mounted position on said frame means in order to lock said support means in mounted position supporting said rotatable element in place in the assembly.

14. In a brake operating mechanism, the combination, with winding mechanism including a winding drum and means to drive the same, of a mounting for said mechanism comprising frame means providing rigidly interconnected, spaced-apart portions by and between which said winding drum is carried, said frame means having an opening through which said winding drum may be inspected, and cover means carried by said frame in position to cover said opening and form an enclosure for said mechanism, said frame means and said cover being formed with cooperating lugs adapted to interengage and hold the cover on the frame, and fastening means to secure said cover on the frame at a place remote from said interengaging lugs whereby the cover may be removed from mounted position on the frame by merely disconnecting the fastening means and disengaging said lugs.

15. In a brake operating mechanism, the combination, with winding mechanism including a winding drum and means to drive the same, of a mounting for said mechanism comprising frame means providing rigidly interconnected, spaced-apart portions by and between which said winding drum is carried, said frame means having an opening of substantial size through which said winding drum may be inspected, and cover means on and cooperatively associated with said frame means to form a weather-excluding enclosure for the winding mechanism, said cover means having a portion overlying the front of said winding mechanism and edge portions offset in position enclosing the sides of said mechanism, portions of said frame means cooperating with said offset edges of the cover means to support the same, and said cover means being readily removable from said frame to permit inspection of the mechanism.

16. In a brake operating mechanism, the combination, with winding mechanism including a winding drum and means to drive the same, of means forming a mounting for said mechanism and a weather-excluding enclosure for the back of said mechanism, said means comprising frame means providing rigidly interconnected, spaced-apart portions by and between which said winding drum is carried, said frame means being adapted for attachment on a vehicle in a substantially permanent manner, with the back of the mechanism facing toward a wall of the vehicle, and said frame having an opening of substantial size in its front to reveal the winding drum for inspection, and cover means carried by and cooperatively associated with said frame in position to cover said opening and enclose the front of the winding mechanism on the frame, said cover means having a portion overlying the front of said mechanism and marginal flange means extending at the sides and top of said frame means, said cover means being readily removable to reveal the winding mechanism for inspection from the front of the unit through said opening without disturbing the winding drum and without dismounting the supporting frame means from the vehicle.

17. In a brake operating mechanism as set forth in claim 16, wherein said winding mechanism, in addition to said winding drum, comprises a pinion drivingly connected with said winding drum, and a shaft mounted in said frame means and carrying said pinion, said cover means having an aperture therein and said shaft having an end projecting outwardly of said cover means through said aperture for the reception on said shaft outwardly of said cover means of a manually operable pinion-turning handle.

18. In a brake operating mechanism as set forth in claim 16, wherein the winding mechanism, in addition to the winding drum, comprises a pinion drivingly connected with said drum, a ratchet wheel connected with said pinion, and a detent pawl swingable into and out of operable engagement with said ratchet wheel whereby selectively to prevent rotation thereof in at least one direction, said pinion and said detent pawl being carried on shafts supported on said frame means and enclosed therein by said cover means, said cover means having shaft apertures therein and said pinion and detent shafts having ends projecting outwardly of said cover means through said apertures for the reception on said shafts outwardly of said cover means of manually-operable handles for turning said shafts.

ARTHUR F. O'CONNOR.